United States Patent
Lee et al.

(10) Patent No.: US 8,796,942 B2
(45) Date of Patent: Aug. 5, 2014

(54) LED CIRCUIT

(75) Inventors: Yeun Joong Lee, Seoul (KR); Deuk Hee Park, Gyunggi-do (KR); Sang Hyun Cha, Seoul (KR); Jae Shin Lee, Gyunggi-do (KR); Change Seok Lee, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 515 days.

(21) Appl. No.: 13/223,933

(22) Filed: Sep. 1, 2011

(65) Prior Publication Data

US 2012/0299497 A1 Nov. 29, 2012

(30) Foreign Application Priority Data

May 24, 2011 (KR) .......................... 10-2011-0049094

(51) Int. Cl.
*H05B 37/02* (2006.01)
(52) U.S. Cl.
USPC ........................ 315/224; 315/185 R; 315/307
(58) Field of Classification Search
USPC .......... 315/209 R, 224, 307, 308, 291, 185 R, 315/193
See application file for complete search history.

(56) References Cited

U.S. PATENT DOCUMENTS

| | | | |
|---|---|---|---|
| 7,791,285 B2* | 9/2010 | Wu | ........................... 315/227 R |
| 2008/0278092 A1* | 11/2008 | Lys et al. | ........................ 315/247 |
| 2010/0231138 A1* | 9/2010 | Kumada et al. | ................. 315/291 |

FOREIGN PATENT DOCUMENTS

KR     10-2010-0071462 A     6/2010

* cited by examiner

*Primary Examiner* — David H Vu
(74) *Attorney, Agent, or Firm* — McDermott Will & Emery LLP

(57) ABSTRACT

There is provided an LED circuit including a light emitting unit including a plurality of light emitting diodes; and a switching unit switching to apply only positive voltage of an AC power supply to an anode of the light emitting unit. Through this, the LED circuit can reduce complexity of a driving circuit. Further, lifespan and efficiency of the LED circuit may be improved since an electrolytic capacitor and a bridge circuit are not used. Further, any one light emitting diode may be prevented from determining the lifespan of all of the light emitting diodes since all of the light emitting diodes are driven at all times, thereby improving the lifespan of the light emitting diode.

8 Claims, 3 Drawing Sheets

LED CIRCUIT

CROSS-REFERENCE TO RELATED APPLICATIONS

This application claims the priority of Korean Patent Application No. 10-2011-0049094 filed on May 24, 2011, in the Korean Intellectual Property Office, the disclosure of which is incorporated herein by reference.

BACKGROUND OF THE INVENTION

1. Field of the Invention

The present invention relates to an LED circuit driving LEDs by commercial AC voltage.

2. Description of the Related Art

A light emitting diode (LED) is a semiconductor device configured as a p-n junction structure and emitting light by the recombination of electrons and holes. The light emitting diode may be manufactured to have a small size while having an excellent monochromatic peak wavelength and light emission efficiency and may be manufactured in an environmentally-friendly manner while having reduced power consumption, or the like. For these reasons, the light emitting diode is rapidly replacing existing lighting devices.

In general, the light emitting diode is driven by a DC power supply of several volts. Therefore, a circuit for driving the existing light emitting diode mainly uses a scheme in which commercial alternating current (AC) voltage is rectified and then constant current is supplied to a light emitting device using a converter such as a flyback converter.

The driving circuits have a relatively complex control structure and require several elements, such as abridge circuit, and a control integrated circuit (IC). In particular, a smoothing electrolytic capacitor has a short lifespan, such that the lifespan of the lighting device using the light emitting diode may be shortened. Further, the driving circuits directly using AC voltage may have light emitting diodes that are not driven at all times among light emitting diodes of a light emitting unit, which may determine the lifespan of the entire light emitting unit.

SUMMARY OF THE INVENTION

An aspect of the present invention provides an LED circuit capable of directly driving a plurality of light emitting diodes by commercial AC voltage without using AC/DC conversion and driving the light emitting diodes at all times regardless of a change in a waveform of an AC voltage.

According to an aspect of the present invention, there is provided an LED circuit, including: a light emitting unit including a plurality of light emitting diodes; and a switching unit switching to apply only positive voltage of an AC power supply to an anode of the light emitting unit.

The switching unit may include: a first single pole double throw (SPDT) connected to an anode of the AC power supply; a second SPDT connected to a cathode of the AC power supply; and a control unit controlling the first SPDT and the second SPDT.

The control unit may perform a control to connect a pole of the first SPDT to the anode of the light emitting unit and a pole of the second SPDT to a cathode of the light emitting unit when the positive voltage of the AC power supply is applied and perform a control to connect the pole of the first SPDT to the cathode of the light emitting unit and connect a pole of the second SPDT to the anode of the light emitting unit when a negative voltage of the AC power supply is applied.

The pole of the first SPDT may be connected to the anode of the AC power supply and the throw thereof may be connected to the anode and the cathode of the light emitting unit, respectively, and the pole of the second SPDT may be connected to the cathode of the AC power supply and the throw thereof may be connected to the anode and the cathode of the light emitting unit, respectively.

The control unit may include a comparator generating an output dependent on a polarity of an AC voltage.

The switching unit may include: a first switching unit supplying the positive voltage of the AC power supply to the light emitting unit by using the negative voltage of the AC power supply as a control signal; and a second switching unit supplying the negative voltage of the AC power supply to the light emitting unit by using the positive voltage of the AC power supply as the control signal.

The first switching unit may include: a first p channel metal-oxide semiconductor field-effect transistor (MOSFET) including a drain connected to one end of the AC power supply, a source connected to the anode of the light emitting unit, and a gate connected to the other end of the AC power supply; and a first n channel MOSFET including a source connected to the drain of the first p channel MOSFET, a drain connected to the cathode of the light emitting unit, and a gate connected to the other end of the AC power supply.

The second switching unit may include: a second p channel MOSFET including a drain connected to the other end of the AC power supply, a source connected to the anode of the light emitting unit, and a gate connected to one end of the AC power supply; and a second n channel MOSFET including a source connected to the drain of the second p channel MOSFET, a drain connected to the cathode of the light emitting unit, and a gate connected to one end of the AC power supply.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
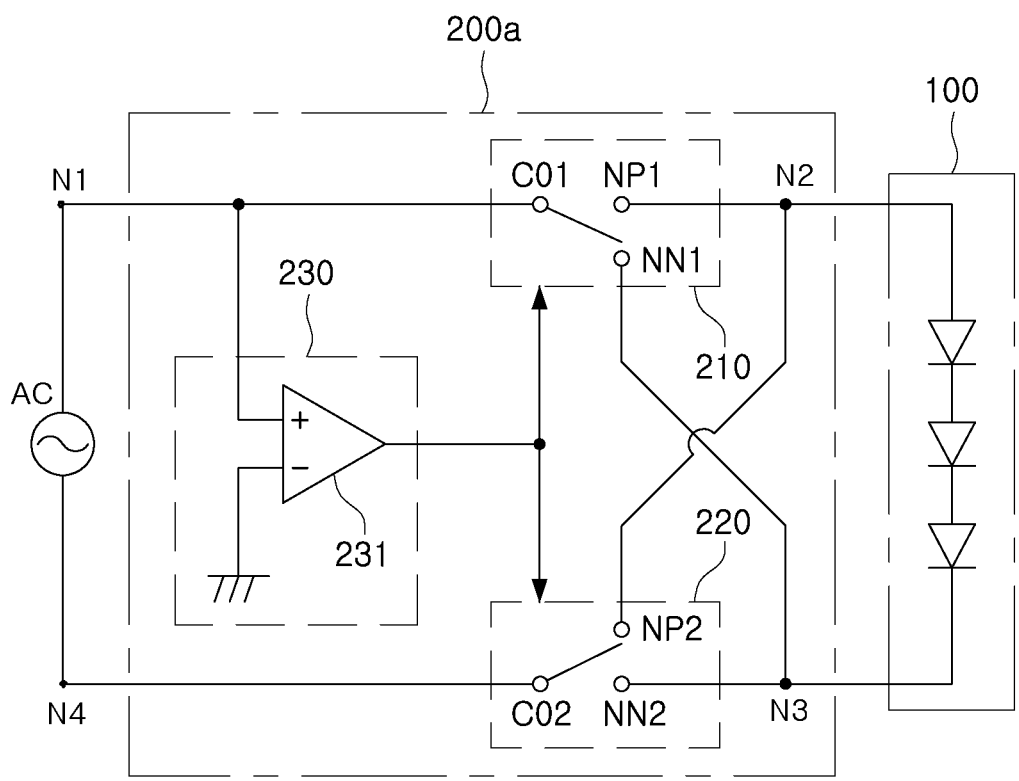
FIG. 1 is a circuit diagram of an LED circuit according to an embodiment of the present invention.

Hereinafter, exemplary embodiments of the present invention will be described with reference to the accompanying drawings.

The present invention should not be seen as being limited to the embodiments set forth herein and the embodiments may be used to assist in understanding the technical idea of the present invention. Like reference numerals designate like components having substantially the same constitution and function in the drawings of the present invention.

FIG. 1 shows a circuit diagram of an LED circuit according to an embodiment of the present invention.

Referring to FIG. 1, an LED circuit according to an embodiment of the present invention may include a light emitting unit 100 and a switching unit 200a.

In FIG. 1, the light emitting unit 100 may include a plurality of light emitting diodes that are connected to each other in series. In this configuration, a configuration of the light emitting diodes of the light emitting unit 100 may be provided as an example and may have various structures such as a serial structure, a parallel structure, a serial and parallel structure and various numbers.

The switching unit 200a may be switched to apply only positive voltage of the AC power supply to an anode of the light emitting unit 100. That is, the AC power supply alternately repeats positive voltage and negative voltage at a predetermined frequency (for example, 60 Hz). The switching unit 200a may be operated to supply the positive voltage to the anode of the light emitting unit 100 in a period in which the AC power supply supplies the positive voltage and supply the negative voltage to a cathode of the light emitting unit 100 in a period in which the AC power supply supplies the negative voltage.

The switching unit 200a may include a first single pole double throw (SPDT) 210, a second SPDT 220, and a control unit, wherein the control unit may include a comparator 231.

The control unit may include the comparator 231 that generates an output dependent on a polarity of the AC voltage. That is, when the waveform of the AC voltage is positive, the comparator 231 may output the positive voltage and when the waveform of the AC voltage is negative, the comparator 231 may output the negative voltage.

A non-inversion terminal of the comparator 231 may be connected to the anode of the AC power supply and an inversion terminal thereof may be connected to a ground. Therefore, the comparator 231 may generate an output according to a change in a sign of the voltage waveform by following up the waveform of the AC voltage.

A pole CO1 of the first SPDT 210 is connected to the anode of the AC power supply, a first throw NP1 thereof is connected to the anode of the light emitting unit 100 and a second throw NN1 thereof is connected to the cathode of the light emitting unit 100. In addition, a pole CO2 of the second SPDT 220 is connected to a cathode of the AC power supply, a first throw NN2 thereof is connected to the cathode of the light emitting unit 100 and a second throw NP2 thereof is connected to the anode of the light emitting unit 100.

When the positive voltage is applied from the AC power supply, the first SPDT 210 is controlled by the control unit to connect the pole CO1 to the throw NP1, such that the anode of the AC power supply is interconnected to the anode of the light emitting unit 100. At the same time, the pole CO2 of the second SPDT 220 is connected to the throw NN2 thereof so as to connect the cathode of the AC power supply to the cathode of the light emitting unit 100.

Describing a closed loop according to the above connection through nodes N1 to N4 and each pole and each throw of the switching unit 200a shown in FIG. 1, when the positive voltage is applied from the AC power supply, current flows along a path N1-CO1-NP1-N2-light emitting unit 100-N3-NN2-CO2-N4.

When the negative voltage is applied from the AC power supply, the first SPDT 210 is controlled by the control unit to connect the pole CO1 to the second throw NN1, such that the anode of the AC power supply is mutually connected to the cathode of the light emitting unit 100. At the same time, the pole CO2 of the second SPDT 220 is connected to the throw NP2 thereof so as to connect the cathode of the AC power supply to the cathode of the light emitting unit 100.

Describing the current path based on the positive voltage, a closed loop N4-CO2-NP2-N2-light emitting unit 100-N3-NN1-CO1-N1 is formed.

Therefore, according to the above-mentioned embodiment, since the positive voltage is applied to the anode of the light emitting unit 100 at all times even in the case that the polarity of the AC voltage is changed, the light emitting unit 100 may be driven at all times over the entire period of the application of the AC voltage.

Figure 2A:
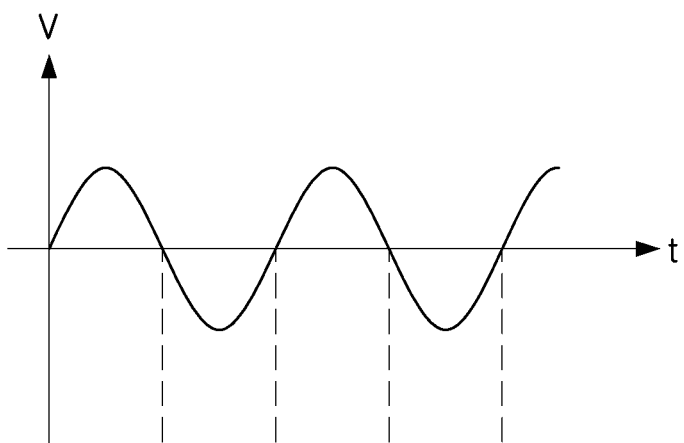
FIGS. 2A through 2C are waveform diagrams in the LED circuit of FIG. 1.
Figure 2B:
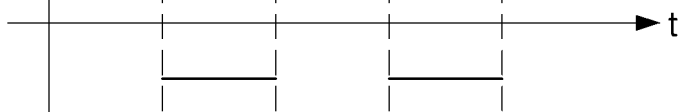
Figure 2C:
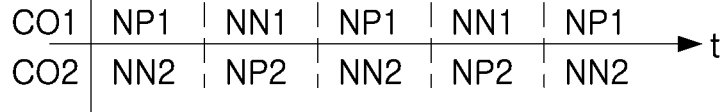

FIGS. 2A through 2C are waveform diagrams in the LED circuit of FIG. 1.

Referring to FIGS. 2A through 2C, FIG. 2A shows an AC voltage waveform, FIG. 2B shows an output from the control unit, FIG. 2C shows an AC voltage waveform, the throw connected to the pole CO1 of the first SPDT 210, and the throw connected to the pole CO2 of the second SPDT 220 that are associated with the output from the control unit.

Referring to FIGS. 2A and 2B, it can be appreciated that the AC voltage is swung to the positive voltage and the negative voltage at the predetermined frequency and the output from the comparator 231 outputs the positive or negative voltage while following up the change in the AC voltage.

Next, referring to FIG. 2C, it can be appreciated that the pole CO1 of the first SPDT 210 is alternately connected to the throw NP1 and the throw NN1 by using the output from the comparator 231 as the control signal. In addition, the connection state of the pole and the throw of the second SPDT 220 corresponding to the connection of the pole and the throw of the first SPDT 210 can also be appreciated.

Figure 3:
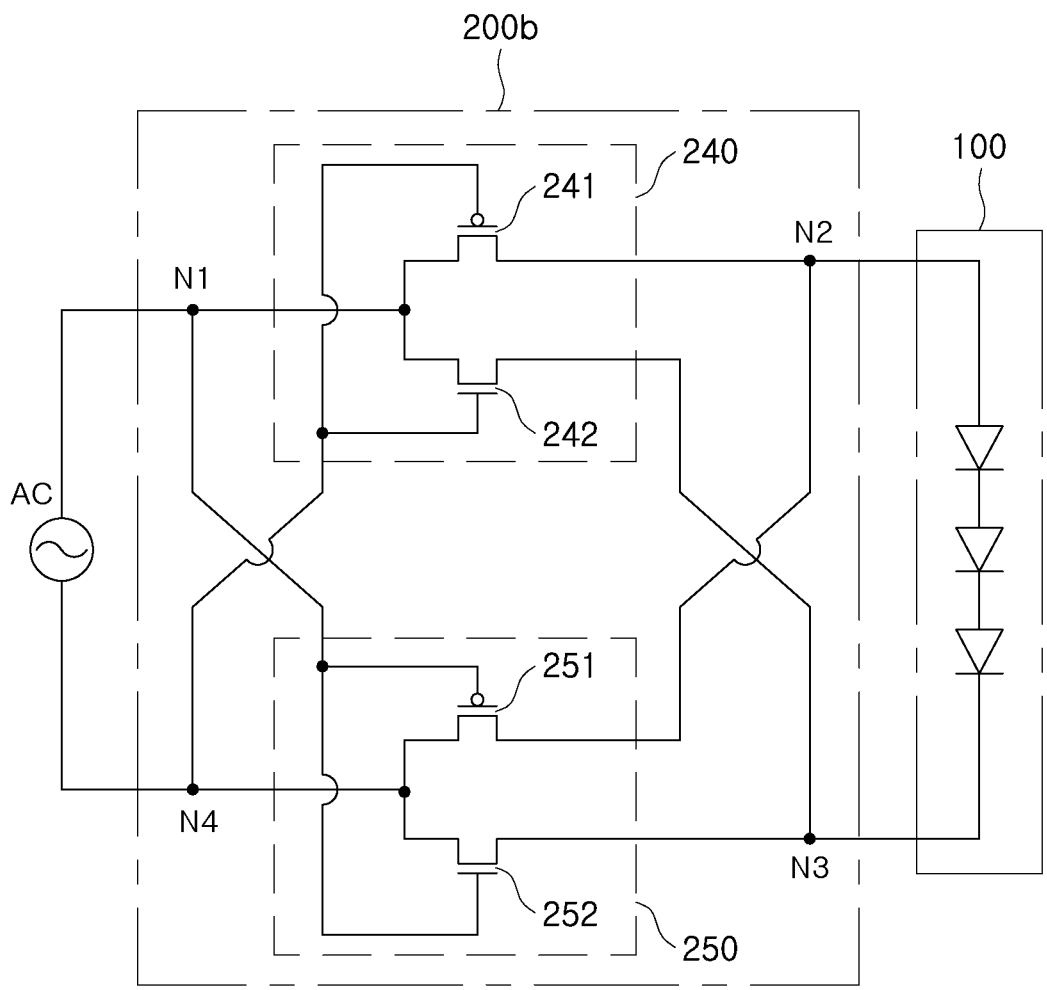
FIG. 3 is a circuit diagram of an LED circuit according to another embodiment of the present invention.

FIG. 3 is a circuit diagram of an LED circuit according to another embodiment of the present invention.

Referring to FIG. 3, a switching unit 200b may include a first switching unit 240 that supplies the positive voltage of the AC power supply to the light emitting unit 100 by using the negative voltage of the AC power supply as the control signal and a second switching unit 250 that supplies the negative voltage of the AC power supply to the light emitting unit 100 by using the positive voltage of the AC power supply as the control signal.

The first switching unit 240 may include a first p channel MOSFET 241 that includes a drain connected to one end of the AC power supply, a source connected to the anode of the light emitting unit 100, and a gate connected to the other end of the AC power supply and a first n channel MOSFET 242 that includes a source connected to the drain of the first p channel MOSFET 241, a drain connected to the cathode of the light emitting unit 100, and a gate connected to the other end of the AC power supply.

In addition, the second switching unit 250 may include a second p channel MOSFET 251 that includes a drain connected to the other end of the AC power supply, a source connected to the anode of the light emitting unit 100, and a gate connected to one end of the AC power supply and a second n channel MOSFET 252 that includes a source connected to the drain of the second p channel MOSFET 251, a drain connected to the cathode of the light emitting unit 100, and a gate connected to one end of the AC power supply.

Describing the change in the AC voltage and the above-mentioned operation of the first switching unit 240 and the second switching unit 250 in detail, when the positive voltage is applied from the AC power supply, the gates of the first p channel MOSFET 241 and the first n channel MOSFET 242 of the first switching unit 240 respectively have the negative voltage of the AC power supply applied thereto. Therefore, since the first p channel MOSFET 241 is turned-on and the first n channel MOSFET 242 is turned-off, the positive voltage supplied to node N1 is supplied to the light emitting unit 100 through the drain and the source of the first p channel MOSFET 241.

In this configuration, the gates of the second p channel MOSFET 251 and the second n channel MOSFET 252 of the second switching unit 250 respectively have the positive voltage of the AC power supply applied thereto. Therefore, since the second p channel MOSFET 251 is turned-off and the second n channel MOSFET 252 is turned-on, the path of N1-N2-N3-N4 through which the positive voltage applied to the light emitting unit 100 in the AC power supply flows may be formed.

When the negative voltage is applied from the AC power supply, the gates of the first p channel MOSFET 241 and the first n channel MOSFET 242 of the first switching unit 240 respectively have the positive voltage of the AC power supply applied thereto. Therefore, the first p channel MOSFET 241 is turned-off and the first n channel MOSFET 242 is turned-on.

In this configuration, the gates of the second p channel MOSFET 251 and the second n channel MOSFET 252 of the second switching unit 250 respectively have the negative voltage of the AC power supply applied thereto. Therefore, since the second p channel MOSFET 251 is turned-on and the second n channel MOSFET 252 is turned-off, the positive voltage may circulate through the closed loop N4-N2-light emitting unit 100-N3-N1.

Similar to the embodiment shown in FIG. 1, the light emitting unit 100 can be driven over the entire period of the AC power supply at all times due to the operation of the above-mentioned first switching unit 240 and second switching unit 250. In addition, according to another embodiment of the present invention shown in FIG. 3, the configuration of the circuit can be simplified since the control unit is not required.

As described above, according to the embodiment of the present invention, the complexity of the driving circuit may be reduced since an AC/DC converter is not required, and the lifespan and the efficiency of the light emitting diode may be improved, since an electrolytic capacitor and a bridge circuit are not used. Further, according to the embodiment of the present invention, anyone light emitting diode may be prevented from determining the lifespan of all of the light emitting diodes since all of the light emitting diodes are driven at all times, thereby improving the lifespan of the light emitting diodes.

As set forth above, according to the embodiment of the present invention, the complexity of the driving circuit may be reduced since the AC/DC converter is not required. In addition, according to the embodiment of the present invention, the lifespan and the efficiency of the light emitting diode may be improved since the electrolytic capacitor and the bridge circuit are not used. Further, according to the embodiment of the present invention, any one light emitting diode may be prevented from determining the lifespan of all of the light emitting diodes since all of the light emitting diodes are driven at all times, thereby improving the lifespan of the light emitting diodes.

While the present invention has been shown and described in connection with the embodiments, it will be apparent to those skilled in the art that modifications and variations can be made without departing from the spirit and scope of the invention as defined by the appended claims.

What is claimed is:

1. An LED circuit, comprising:
    a light emitting unit including a plurality of light emitting diodes; and
    a switching unit switching to apply only positive voltage of an alternating current (AC) power supply to an anode of the light emitting unit.

2. The LED circuit of claim 1, wherein the switching unit includes:
    a first single pole double throw (SPDT) connected to an anode of the AC power supply;
    a second SPDT connected to a cathode of the AC power supply; and
    a control unit controlling the first SPDT and the second SPDT.

3. The LED circuit of claim 2, wherein the control unit performs a control to connect a pole of the first SPDT to the anode of the light emitting unit and a pole of the second SPDT to a cathode of the light emitting unit when the positive voltage of the AC power supply is applied and performs a control to connect the pole of the first SPDT to the cathode of the light emitting unit and connect a pole of the second SPDT to the anode of the light emitting unit when a negative voltage of the AC power supply is applied.

4. The LED circuit of claim 2, wherein the pole of the first SPDT is connected to the anode of the AC power supply and the throw thereof is connected to the anode and the cathode of the light emitting unit, respectively, and
    the pole of the second SPDT is connected to the cathode of the AC power supply and the throw thereof is connected to the anode and the cathode of the light emitting unit, respectively.

5. The LED circuit of claim 2, wherein the control unit includes a comparator generating an output dependent on a polarity of an AC voltage.

6. The LED circuit of claim 1, wherein the switching unit includes:
    a first switching unit supplying the positive voltage of the AC power supply to the light emitting unit by using the negative voltage of the AC power supply as a control signal; and
    a second switching unit supplying the negative voltage of the AC power supply to the light emitting unit by using the positive voltage of the AC power supply as the control signal.

7. The LED circuit of claim 6, wherein the first switching unit includes:
    a first p channel metal-oxide semiconductor field-effect transistor (MOSFET) including a drain connected to one end of the AC power supply, a source connected to the anode of the light emitting unit, and a gate connected to the other end of the AC power supply; and
    a first n channel MOSFET including a source connected to the drain of the first p channel MOSFET, a drain connected to the cathode of the light emitting unit, and a gate connected to the other end of the AC power supply.

8. The LED circuit of claim 7, wherein the second switching unit includes:
    a second p channel MOSFET including a drain connected to the other end of the AC power supply, a source connected to the anode of the light emitting unit, and a gate connected to one end of the AC power supply; and
    a second n channel MOSFET including a source connected to the drain of the second p channel MOSFET, a drain connected to the cathode of the light emitting unit, and a gate connected to one end of the AC power supply.

* * * * *